(12) United States Patent
Tober

(10) Patent No.: US 10,343,658 B2
(45) Date of Patent: Jul. 9, 2019

(54) MULTI-TRAILER VEHICLE ABS STATUS EVALUATION

(71) Applicant: Bendix Commercial Vehicle Systems, LLC, Elyria, OH (US)

(72) Inventor: Michael D. Tober, Avon, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 15/817,382

(22) Filed: Nov. 20, 2017

(65) Prior Publication Data

US 2019/0152453 A1 May 23, 2019

(51) Int. Cl.
*B60T 8/17* (2006.01)
*B60T 8/18* (2006.01)
*B60T 8/172* (2006.01)
*B60T 8/176* (2006.01)

(52) U.S. Cl.
CPC ........... *B60T 8/1708* (2013.01); *B60T 8/172* (2013.01); *B60T 8/176* (2013.01); *B60T 8/1806* (2013.01); *B60T 8/1887* (2013.01); *B60T 2250/02* (2013.01)

(58) Field of Classification Search
CPC ........ B60T 8/1708; B60T 8/172; B60T 8/176; B60T 8/1806; B60T 8/1887; B60T 2250/02
USPC ......................................................... 701/71
See application file for complete search history.

(56) References Cited

U.S. PATENT DOCUMENTS

| 4,804,237 A | * | 2/1989 | Gee | ........................... B60T 7/20 188/3 R |
| 6,273,522 B1 | | 8/2001 | Feetenby et al. | |
| 2001/0054524 A1 | * | 12/2001 | Masters | ............... B62D 13/005 180/400 |

FOREIGN PATENT DOCUMENTS

DE        44 46 358 C1        12/1995

* cited by examiner

*Primary Examiner* — Marthe Y Marc-Coleman
(74) *Attorney, Agent, or Firm* — Crowell & Moring LLP

(57) ABSTRACT

An apparatus and method are provided for determining the braking status of trailers and dollies in a multi-trailer vehicle train. A vehicle controller receives inputs from the vehicle to determine an estimate of the total vehicle mass from the dynamic response of the vehicle to an input such as application of engine torque, and to determine an estimate of the loads of the vehicle based on information provided from trailers and dollies communicating with the vehicle controller. A plausibility analysis is conducted to determine whether the estimates are within a tolerance range indicative of whether all of the trailers and dollies are communicating with the vehicle controller. If the vehicle controller determines that not all of the trailer and dolly anti-lock braking and/or stability control systems are available, the vehicle controller may in subsequent braking events command trailer and dolly brake application at a reduced level intended to avoid trailer and dolly wheel skidding.

9 Claims, 4 Drawing Sheets

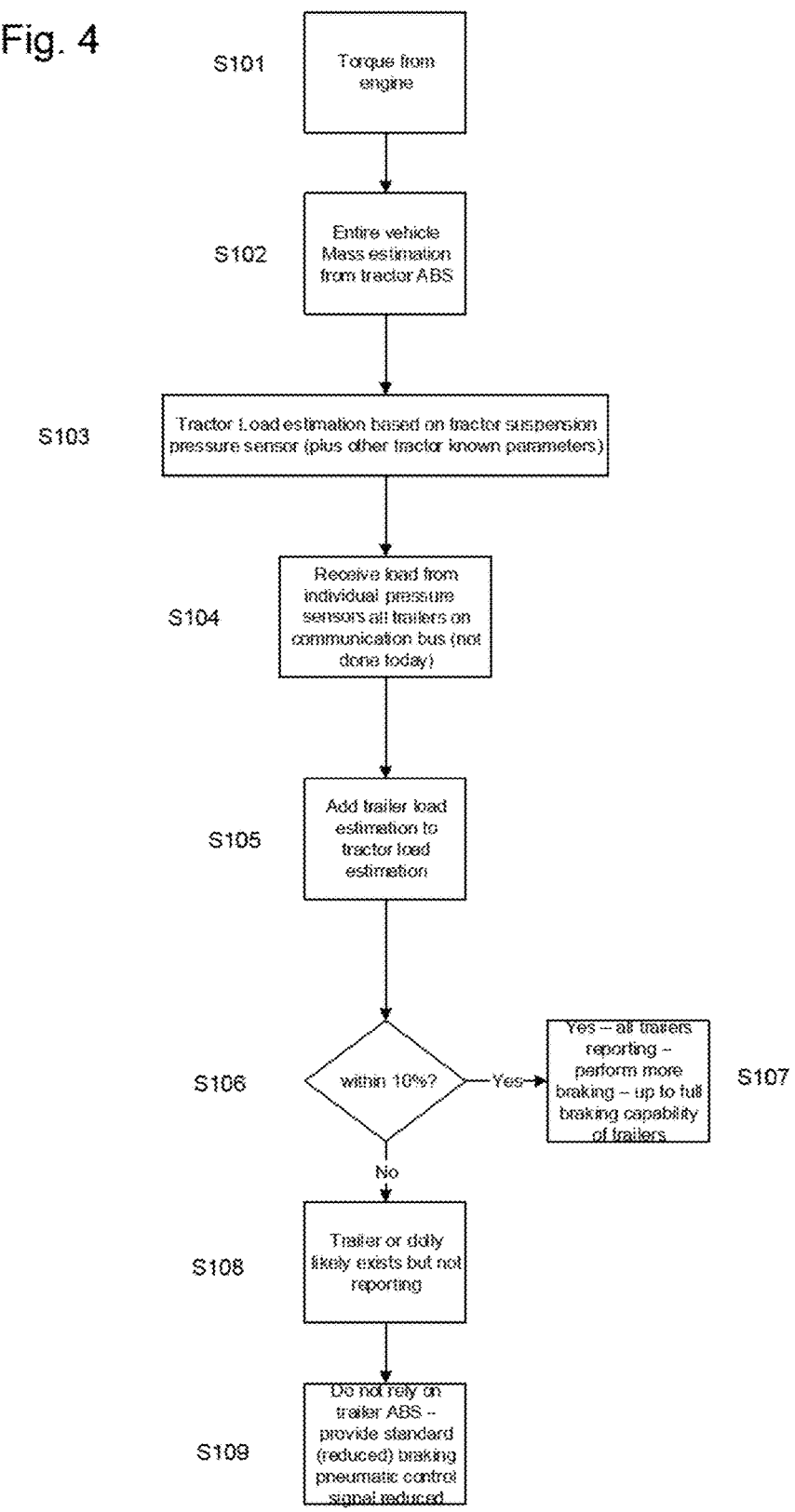

MULTI-TRAILER VEHICLE ABS STATUS EVALUATION

BACKGROUND AND SUMMARY OF THE INVENTION

The present invention relates to braking system for vehicles with multiple trailers, and in particular to a system and method for determining the operational status on an anti-lock braking system in a chain of multiple-trailers being towed by a commercial vehicle.

Commercial vehicles such as Class 8 tractor-trailers are more frequently being configured with the tractor towing more than one trailer. Typically, the hitch pin of a first trailer is received by the tractor, and fifth-wheel dolly units connect the following trailers to one another, i.e., a fifth-wheel dolly unit attached to the rear of each leading trailer receives the hitch pin of a following trailer.

With each additional trailer unit in the tractor-trailer combination, the vehicle dynamics become more complicated, making it more difficult for the tractor operator to maintain full control over the movements of the multiple trailers. Maintaining control of the entire vehicle train is of particular concern during braking events, when any of several factors (such as misalignment of one or more of the trailers in the train, different surface conditions under different trailer and dolly wheels, different braking forces generated at the individual trailer and dolly wheel brakes, and/or braking system defects in individual trailers) can lead to unstable braking and undesired lateral trailer motion. These undesired motions may not only disturb one trailer's response to the braking event, they may also propagate to the other trailers, increasing the chances for trailer jack-knifing, overturning, and/or collision with adjacent vehicles and/or road-side objects.

It is well known in the art to equip commercial vehicles with antilock braking ("ABS") systems and stability control systems to improve vehicle stability by minimizing wheel locking and undesired yawing motions (for example, by unlocking individual wheels or the wheels of individual axles, or selectively applying wheel brakes on one side of the vehicle to reduce lateral motion relative to the vehicle travel direction). While such systems have been successfully applied to commercial vehicles having a single trailer in direct electrical, pneumatic and/or hydraulic connection with the tractor's braking and stability control systems, automated trailer braking on commercial vehicle combinations with multiple trailers is less common, in part because integration of anti-lock braking and/or stability control systems in multiple trailer vehicles depends on all of the trailers being equipped with ABS systems, all of the trailers' ABS systems being functional when the vehicle is being operated, and all of the trailers' systems communicating their status to the tractor.

Detection of the number of trailers and dollies in multi-trailer commercial vehicles is not a current industry practice, and state-of-the-art systems in North America do not reliably evaluate the presence and status of trailer ABS systems on multiple trailers. Thus, automated trailer braking is limited, with current automated braking systems typically not applying braking using the full available braking pressure to trailers (i.e., limiting the automated trailer brake pressure and pulse the brakes to minimize lateral instability as best as possible in the circumstances) if it is not known whether one or more of the trailers and/or dollies in the combination is not ABS-equipped, or whether one or more of the trailers has a non-functioning ABS system.

The present invention addresses these and other problems in an efficient and cost-effective manner, without requiring every trailer in a multi-trailer vehicle train to be equipped with additional components or to conform to a particular configuration specification. Rather, in the present invention the braking status of the trailers and dollies in a multi-trailer train is determined by automatic measurement and calculation.

As part of the approach of the present invention, a processor on the vehicle, such as an ABS system controller or a separate controller, determines the total vehicle mass based on the dynamic response of the vehicle to an input. For example, the amount of output torque of the engine and the vehicle's acceleration response to the applied output torque may be used to derive an estimate of the vehicle mass. Separate from the total vehicle mass estimate based on dynamic response, the total load of the vehicle may be estimated by summing the vehicle loads (e.g., the tractor's load on its wheels including the load from the first trailer attached to the tractor, plus the loads on the trailer axles and the dollies reporting to the tractor). These mass and load estimates are then subjected to a plausibility analysis to determine whether all of the trailers and dollies are communicating with the vehicle controller, and thus whether all of the trailer and dolly braking systems (including their respective anti-lock braking and stability control systems) are available to support full application of the vehicle brakes during subsequent braking events.

Once the ABS and/or stability control system status of the vehicle train is known, if any of the trailers or dollies are determined to not have properly reported their data to the vehicle controller, the controller may then operate the brakes in a subsequent braking event at a reduced level intended to avoid brake application at a level high enough to induce wheel skidding (i.e., wheel behavior that would otherwise be ameliorated by an active ABS and/or stability control system).

Alternatively, if the vehicle is equipped for individual trailer and dolly braking system control, the vehicle's ABS and/or stability control systems may be adapted to recognize the actual present braking capabilities of the each of tractor, trailers and dollies, and thereby prepare the system to apply the tractor, trailer and dolly brakes on an individual brake and/or individual axle basis in a manner that takes into account the determined variations in braking capacity. Accordingly, the present invention provides the ability to increase the available braking force that may be applied to the vehicle, as compared to the prior art default operating state if the braking status of the trailers and dollies was unknown, i.e., limiting brake application at the trailers and/or dollies to avoid over-braking and resulting vehicle instability. The present invention thus provides the ability to improve the overall vehicle train braking performance and stability by tailoring the brake application to the specific vehicle configuration.

The loads on each of the tractor, dollies and trailers may be measured or otherwise determined in a variety of ways. For example, on vehicles equipped with air suspensions, the loads may be measured using pressure sensors. If the vehicles have mechanical suspensions without load detection sensors (e.g., leaf spring suspension), the load may be measured using ride height sensors. An optical detection system could also be used to detect the number of trailers and dollies in the vehicle train, either by an optical system hosted on the vehicle or by an optical system that is part of yard infrastructure that transmits data to the vehicle.

Other objects, advantages and novel features of the present invention will become apparent from the following detailed description of the invention when considered in conjunction with the accompanying drawings.

BRIEF DESCRIPTION OF THE DRAWINGS

FIG. 4 is a logic diagram of a control logic of a method in accordance with the present invention.

DETAILED DESCRIPTION OF THE DRAWINGS

Figure 1:
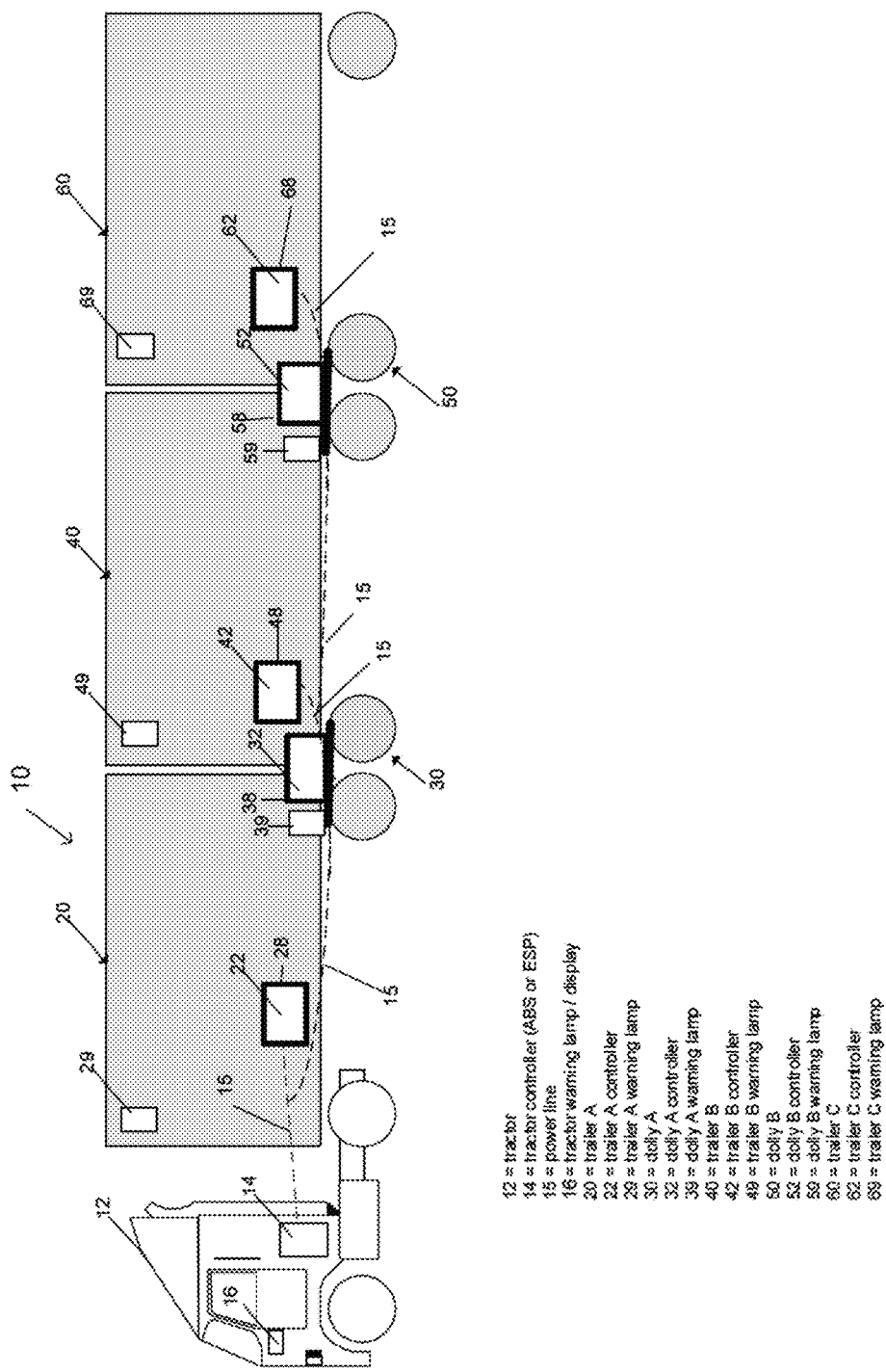
FIG. 1 is a schematic view of a multi-trailer vehicle in accordance with an embodiment of the present invention.

The commercial vehicle 10 in the embodiment shown FIG. 1 includes a tractor 12, trailers 20, 40, 60 (also referred to herein as trailer A, trailer B and trailer C, respectively), and fifth-wheel dollies 30, 50 (dolly A, dolly B). The tractor 12 includes a tractor controller 14, and an associated tractor warning light and/or display unit 16. The controller 14 may be a single-function or multi-function controller. For example, the controller 14 may be configured to provide anti-lock braking (ABS) and electronic stability (ESP) functions to the vehicle. An example of such a controller is the Bendix® ESP® EC80™ Controller available from Bendix Commercial Vehicle Systems, LLC of Elyria, Ohio.

The trailers 20, 40, 60 in this embodiment are each provided with respective trailer controllers 22, 42, 62 in trailer control systems 28, 48, 68, and associated trailer warning lights 29, 49, 69 controlled by their trailer controllers. The dollies 30, 50 are equipped with respective dolly controllers 32, 52 in dolly control systems 38, 58, with associated dolly warning lights 39, 59. The tractor controller 14, trailer controllers 22, 42, 62 and dolly controllers 32, 52 communicate over power line 15.

Figure 2:
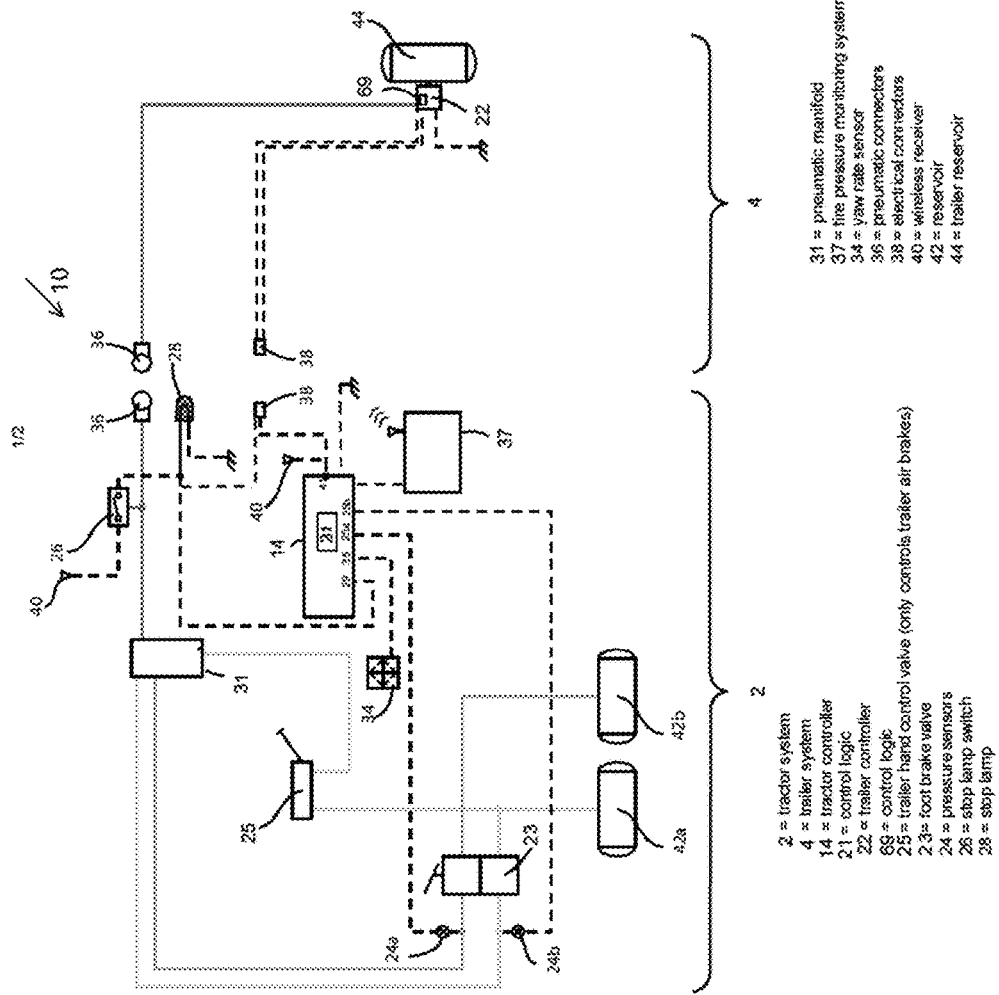
FIG. 2 is a schematic view of pneumatic and electrical components in the vehicle train of FIG. 1.

FIG. 2 schematically illustrates in greater detail the brake control system in the FIG. 1 vehicle, with a tractor portion 2 and a trailer portion 4 for a first one of the trailers. The connections of the subsequent dollies and trailers in the vehicle train are similar to those of the first trailer, and for clarity of illustration are omitted from this figure.

The tractor portion 2 includes a driver-activated foot brake valve 23 for actuation of the vehicle brakes, and a trailer hand control valve 25 which controls the trailer brakes (for example, for releasing the trailer brakes prior to moving a parked vehicle). These valves control the flow of brake actuation compressed air from storage reservoir tanks 42a, 42b. When the valves are actuated, compressed air is directed through flow circuits in pneumatic manifold 31 for distribution to the appropriate wheel brakes.

The compressed air lines from the foot brake valve 23 are provided with pressure sensors 24a, 24b which provide pressure signals to tractor controller 14. The tractor controller 14 also receives inputs from a variety of additional sources, such as yaw rate sensor 34, and tire pressure monitoring system 37 (which communicates wirelessly in a known manner with individual wheel tire pressure sensors, not illustrated), and using control logic 17 generates outputs to control actuation of various braking system components, both directly at the tractor and indirectly at the trailers via electrical connections 38 and solenoid-controlled pneumatic flow control valves (not illustrated) operating via pneumatic connections 36. The controller 14 in this embodiment is also programmed to control the activation of the vehicle brake lights, including tractor brake lights 28 and the trailer brake lights (not illustrated).

In trailer portion 4, the electrical and pneumatic signals transferred over electrical connections 38 and pneumatic connections 36 are received at the trailer controller 22 and processed using control logic 21 to control operation of the trailer (or dolly) wheel brakes supplied from the trailer (or dolly) compressed air storage reservoir 44. The electrical and pneumatic distribution to the trailer or dolly braking equipment from the controller and compressed air reservoir is shown in FIG. 3.

Figure 3:
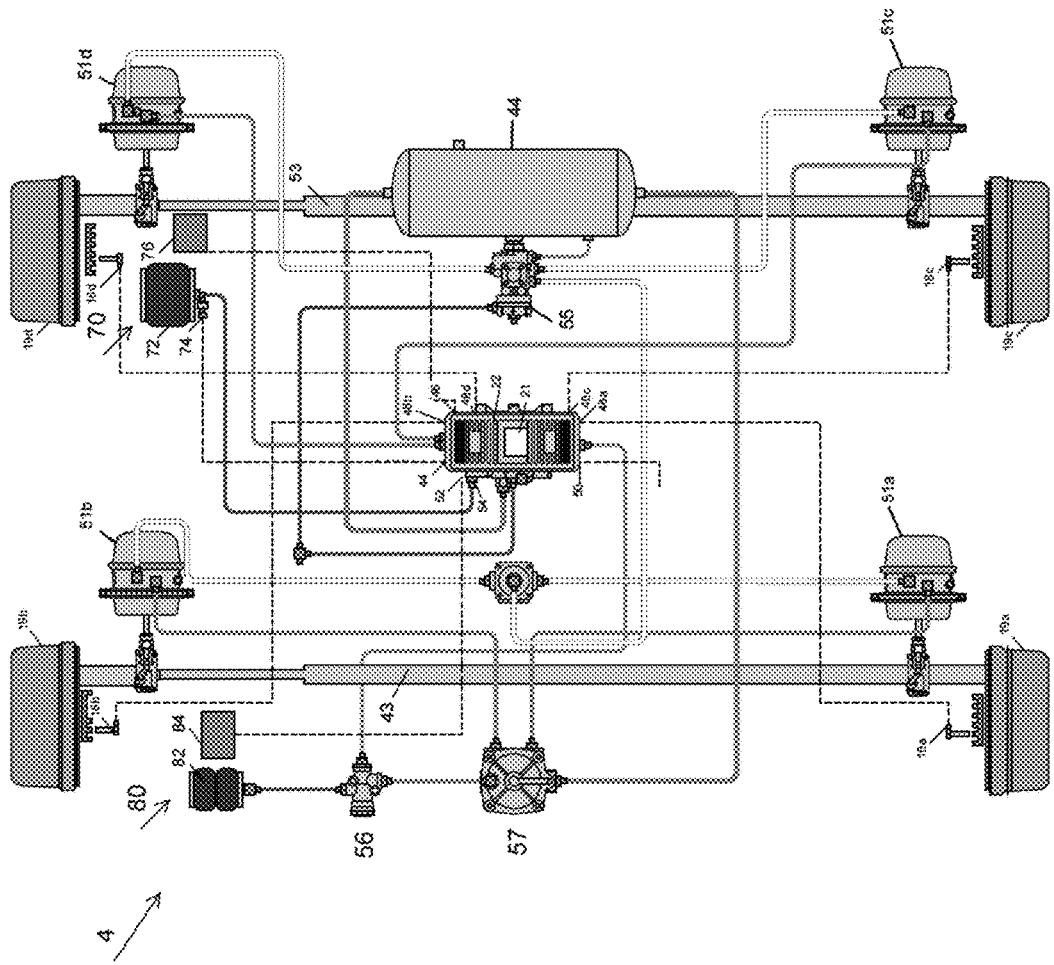
FIG. 3 is a schematic view of pneumatic and electrical components in a trailer of the FIG. 1 vehicle train.

FIG. 3 schematically illustrates a double-axle trailer suspension and wheel brake system. One of ordinary skill in the art will recognize that single-axle variations suitable for use with single-axle trailers and single-axle dollies are known.

In this embodiment first and second axles 42, 52 of a double-axle trailer is equipped with wheel drum brakes 19a-19d. The drum brakes are actuated by pneumatic brake actuators 51a-51d. The brake actuators include parking brake release chambers which are supplied with compressed air from trailer compressed air reservoir 44 via valve 55 for release of the parking brakes. The valve 55 may be pneumatically-actuated or be an electrically-actuated solenoid valve which responds to pneumatic or electric commands, as appropriate, from trailer controller 22 having control logic 21. In this embodiment, the trailer controller 22 is a multi-channel trailer controller such as the Bendix® TABS-6™ Advanced Multi-Channel Trailer ABS Module available from Bendix Commercial Vehicle Systems, LLC of Elyria, Ohio. In single-axle applications, a controller such as the single-channel version of the Bendix® TABS-6™ module may be used.

The trailer controller 22 also controls the application of service brake air pressure to the service brake chambers of the brake actuators and, using wheel speed inputs from wheel speed sensors 18a-18d, modulates service brake pressure to provide anti-lock braking. In this embodiment the service brake actuators are operated on an axle-by-axle basis, but the use of a controller having independent wheel control channels would permit the ABS functionality to be implemented on a wheel-by-wheel basis.

The trailer controller here is capable of controlling both an axle air suspension system 70 including air suspension bags 72, air suspension pressure sensor 74 and air bag solenoid 76, and an axle lift system 80 including lift axle air bags 82 and lift axle solenoid 84. In this embodiment the trailer controller 22 directly controls the supply and venting of compressed air to the air suspension air bags 72, and controls the supply and venting of compressed air to the lift axle air bags 82, using solenoid valve 56 to control flow from reservoir 44 via distribution valve 57.

In operation, the tractor controller 14 obtains information from the vehicle sensors and data communicated from the trailer and dolly controllers to determine the braking status of the vehicle for subsequent use in brake application events. An example control logic for the inventive vehicle braking evaluation process is shown in FIG. 4. In step S101 the tractor controller 14 obtains information on the torque output of the tractor engine, in this embodiment using data from other vehicle controllers transmitted over a vehicle network. In step S102, using vehicle acceleration data obtained via sensors (for example, acceleration sensors) and/or calculation based on vehicle velocity change, the tractor controller 14 estimates the mass of the entire vehicle.

The tractor controller 14 next generates an estimate of the load on the tractor from the first trailer in step S103, for example by deriving the vertical load on the tractor based on the pressure in the tractor air suspension system and other tractor parameters (such as the tractor suspension ride height, the tractor's unloaded weight, suspension air pressure, ride height and the load on the steering axle).

The trailer loads are estimated at step S104. As with the tractor, the vertical loads on the trailers and the dollies may be determined by sensors such as the suspension air pressure in each trailer and dolly suspension units (and/or other devices, such as load cells measuring loads at the hitch plate and hitch pin interface between the trailers and the dollies). This and other data, such as the status of trailer lift axles, may be transmitted over data links (wired or wireless) from the trailers and dollies to the tractor controller 14.

At step S105 the estimated tractor, trailer and dolly loads are summed to obtain a total vehicle load estimate. The total vehicle load estimate is then compared in step S106 to the entire vehicle mass estimate obtained in step S102 in a plausibility analysis that determines whether the two estimates are within a plausible range (in this embodiment, within 12% of one another). The plausibility analysis determines whether the information reported to the tractor controller 14 from the trailers and dollies is consistent with the vehicle mass estimate of the entire vehicle within a predetermined tolerance (i.e., within a "plausible range"). If the estimates are determined to be plausible, at step S107 the system determines that all of the trailers and dollies in the vehicle train are properly reporting data to the tractor controller 14, i.e., that the data transfer links are functioning and the individual trailer and dolly braking status is available to the tractor controller. The tractor controller 14 operates the vehicle brakes in subsequent braking events based on the assessment that all of the trailers and dollies are capable of providing full braking capability, and thus full ABS and stability control functions may be reliably executed.

If on the other hand in step S106 the system determines that the estimates are not plausible, i.e., not within the predetermined tolerance range, the system determines that it is likely that at least one of the trailers and dollies is not reporting properly, and thus cannot be relied upon to provide full braking capability to the vehicle train. Accordingly, in step S109 the tractor controller 14 operates the vehicle brakes in subsequent braking events based on the assessment that operation of all of the trailer and dolly ABS and/or stability control functions cannot be carried out. Therefore the vehicle braking is to be carried out in a standard braking mode, for example, operating the trailer and dolly brakes with a reduced braking pneumatic pressure control signal in order to avoid over-braking of a trailer or dolly (i.e., to avoid a wheel skidding event that would otherwise have been addressed by an ABS and/or stability control system using full available braking pressure). The tractor controller 14 may also issue a warning signal to be displayed on the tractor warning display 16 to alert the driver to the decreased available braking capacity and vehicle stability.

In other embodiments of the present invention, the tractor controller 14 control logic 17 may be programmed to ascertain, from the data transferred from the trailers and dollies, which individual trailer(s) or dolly(ies) is not communicating with the tractor controller. This would permit identification of individual trailers or dollies for which the availability of trailer or dolly ABS and/or stability control cannot be assured, which in turn would permit the tractor controller 14 in subsequent braking events to provide greater braking performance than would otherwise be available if all of the trailers and dollies had to be assumed to not have ABS and/or stability control functions.

For example, if the vehicle's trailer and dolly braking systems are individually controllable by the tractor controller 14 (for example, in a vehicle in which the brakes are pneumatically actuated based on braking signals electrically or electronically transmitted by the controller 14 to individual trailers and dollies), then the tractor controller 14 may take into account the presumed absence of ABS or stability control on the individual non-reporting trailer or dolly by supplying the trailer or dolly with a reduced braking control signal, while still issuing braking control signals to reporting trailers and dollies that permit up to full braking application. Preferably, the tractor controller control logic further would be programmed to take into account the effects on vehicle dynamics of the position of the non-reporting trailer or dolly in the vehicle train. The trailer or dolly position may be determined, for example, by comparing the vehicle train's known configuration of trailers and dollies to the reporting trailer and dolly information, and determining from the absence of particular trailer or dolly identification information in the reported data which of the trailers and dollies known to be present is not reporting to the tractor controller 14.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 10 vehicle
12 tractor
14 tractor controller
15 power line
16 tractor warning light/display
17 tractor controller control logic
18a-18d wheel speed sensor
19a-19d wheel drum brake
20, 40, 60 trailer
21 trailer controller control logic
22, 42, 62 trailer controller
23 foot brake valve
24a, 24b pressure sensor
25 trailer hand brake control valve
28 tractor brake lights
29, 49, 69 trailer warning light
30, 50 dolly
32, 52 dolly controller
34 yaw rate sensor
37 tire pressure monitoring system
36 pneumatic connection
38 electrical connection
39, 59 dolly warning light
42a-42b, 44 compressed air reservoir
43, 53 axle
51a-51d pneumatic brake actuator
55 pneumatic control valve
56 solenoid valve
57 distribution valve
70 air suspension system
72 air suspension air bag
74 air suspension pressure sensor
76 air bag solenoid 80 axle lift system
82 lift axle air bag
84 lift axle solenoid

What is claimed is:

1. A method of setting a braking mode of a vehicle comprising a tractor, at least two trailers and at least one trailer dolly and at least one vehicle controller, the method comprising the acts of:
   estimating using the vehicle controller an entire vehicle mass from a dynamic response of the vehicle to an input;
   estimating using the vehicle controller a vehicle load;
   performing a plausibility analysis based on the estimate of the entire vehicle mass and the estimate of the vehicle load using the vehicle controller; and
   setting a vehicle braking mode usable in a subsequent braking event based on the result of the plausibility analysis.

2. The braking mode setting method of claim 1, wherein in the act of performing the plausibility analysis, the vehicle controller determines whether the estimate of the entire vehicle mass and the estimate of the vehicle load are within a predetermined plausibility range of one another.

3. The braking mode setting method of claim 2, wherein the predetermined plausibility range is 0-12%.

4. The braking mode setting method of claim 3, wherein the vehicle load is estimated based on summing tractor loads and any loads reported to the vehicle controller from the at least two trailers and the at least one dolly.

5. The braking mode setting method of claim 4, wherein if the plausibility analysis result is determined by the vehicle controller to be implausible, the vehicle braking mode is set to control braking commands to the at least two trailers and the at least one trailer dolly to generate braking forces at trailer and dolly wheels below a braking force at which wheel skidding occurs.

6. The braking mode setting method of claim 4, wherein if the plausibility result is determined by the vehicle controller to be plausible, the braking mode is set to control braking commands to the at least two trailers and the at least one trailer dolly to generate braking forces generate braking forces at trailer and dolly wheels up to a maximum available trailer and dolly braking pressure.

7. The braking mode setting method of claim 4, further comprising the act of:
   if the plausibility analysis result is determined by the vehicle controller to be implausible, determining using the vehicle controller which of the at least two trailers and the at least one dolly did not provide load information to the vehicle controller for use in the act of estimating the vehicle load,
   wherein in the act of setting the vehicle braking mode the vehicle braking mode is set to control braking commands to the ones of the at least two trailers and the at least one trailer dolly determined to have not provided load information to the vehicle controller to generate braking forces below a braking force at which wheel skidding occurs, and to control braking commands to the ones of the at least two trailers and the at least one trailer dolly which reported load information to the vehicle controller to generate braking forces up to a maximum available trailer and dolly braking capability.

8. A braking system of a vehicle comprising a tractor, at least two trailers and at least one trailer dolly and at least one vehicle controller, comprising:
   a vehicle controller; and
   braking system controllers of each of the at least two trailers and the at least one dolly;
   wherein the vehicle controller is configured to
      determine an estimated entire vehicle mass from received vehicle dynamic response data,
      determine an estimated vehicle load based on loads on the tractor and load information received from the at least two trailers and the at least one trailer dolly,
      perform a plausibility analysis based on the estimate of the entire vehicle mass and the estimate of the vehicle load using the vehicle controller; and
      set a vehicle braking mode usable in a subsequent braking event based on the result of the plausibility analysis.

9. A braking system controller of a vehicle, comprising:
   a controller configured to receive driver braking demand inputs and inputs from a tractor, at least two trailers and at least one trailer dolly of the vehicle, and to output issue braking control commands to at least one of the tractor, at least two trailers and at least one trailer dolly of the vehicle,
   wherein the controller is configured to execute a braking control method in which the controller
      estimate an entire vehicle mass from a dynamic response of the vehicle to an input;
      estimate a vehicle load;
      perform a plausibility analysis based on the estimate of the entire vehicle mass and the estimate of the vehicle load using the vehicle controller; and
      set a vehicle braking mode usable in a subsequent braking event based on the result of the plausibility analysis.

* * * * *